Patented Jan. 4, 1949

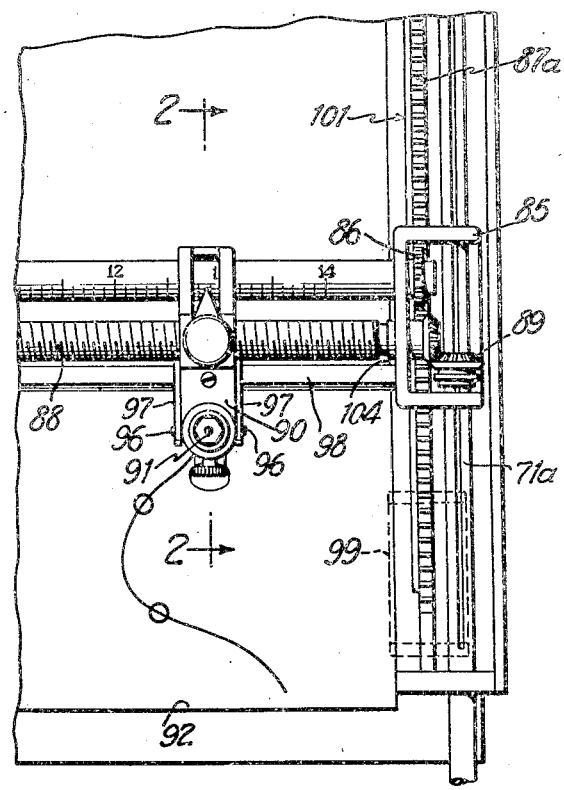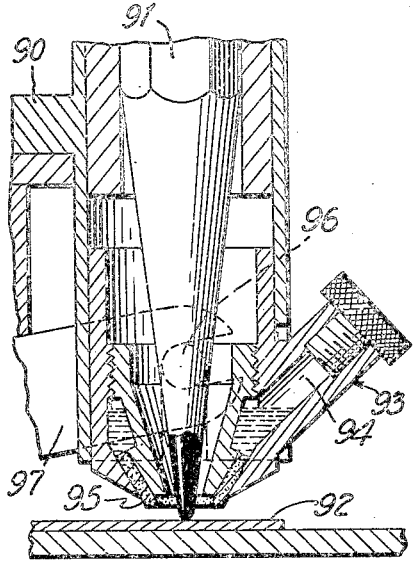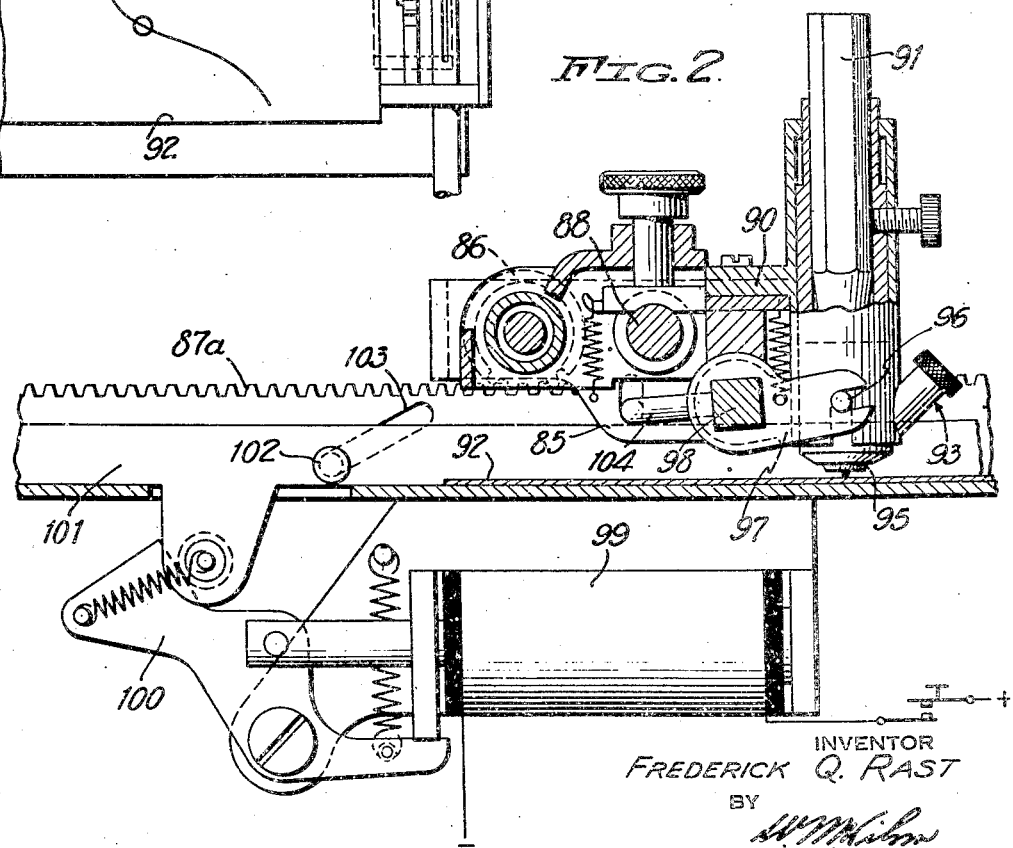

2,458,418

UNITED STATES PATENT OFFICE 2,458,418

CONTINUOUS AND INTERMITTENT RECORDING INSTRUMENT

Frederick Q. Rast, Rochester, N. Y., assignor to International Business Machines Corporation, New York, N. Y., a corporation of New York Original application April 29, 1943, Serial No. 485,023. Divided and this application April 12, 1944, Serial No. 530,705

1 Claim. (Cl. 346—50)

This application is a division of application Serial No. 485,023, filed April 29, 1943, now Patent No. 2,424,118 of July 15, 1947, which relates to a device for continuously and automatically recording the path of flight of an airplane and more particularly to a device of the type in which a graph is drawn to record the course of flight.

One of the objects of the invention resides in the provision of an auxiliary device cooperating with the recording mechanism to make an identifying mark on the graph as it is drawn, which device is responsive to a received signal and will accordingly indicate a point in the course of flight at which such signal is received.

A specific object of the invention is to provide a novel recording device comprising dual recording elements one of which marks a continuous line and the other marks an indication upon said line. To this end the second marking device is in the form of a circle surrounding the first, pointed stylus and is arranged for relative axial movement upon the first.

Other objects of the invention will be pointed out in the following description and claim and illustrated in the accompanying drawings, which disclose, by way of example, the principle of the invention and the best mode, which has been contemplated, of applying that principle.

In the drawings:

Fig. 1 is a corner of the recording table showing the drive connections to the recording elements.

Fig. 2 is a sectional detail on lines 2—2 of Fig. 1.

Fig. 3 is an enlarged detail of the stylus and marking device.

Referring to Fig. 1, 90 designates the pencil or stylus holder which is threaded on lead screw 88 and in which pencil 91 is held to trace the course of a vehicle on a map or other suitable surface designated 92. Lead screw 88 is supported in a carriage 85 which through a gear 86 and stationary rack 87a is movable vertically. Screw 88 has bevel gear connection 89 with a splined shaft 71a whereby the screw 88 is turned to effect horizontal movement of holder 90 and as explained in the parent application the holder may be moved in any direction by suitable operation of shaft 71a and carriage 85.

Referring to Figs. 2 and 3, the right hand extremity of the holder 90 forms a cylindrical sleeve within which there is slidably positioned a marking device generally designated 93, which comprises a fluid reservoir 94 and a marking wick 95 which surrounds the pencil 91. Downward movement of the marking device 93 will cause a circular ring to be made on the map 92. Pins 96 extend outwardly from the device 93, and these are engaged by arms 97 which are slidable along a square shaft 98 carried by the frames 85 and normally held in the position shown in Fig. 2 by a suitable spring. Located beneath the map table is a solenoid 99 which, when energized, will retract its plunger to rock a lever 100 clockwise and will move a bar 101 upwardly and toward the right as viewed in Fig. 2, this movement being effected through engagement of a pin 102 in the bar operating in an oblique slot 103 in the fixed rack 87a. The square shaft 98 has near its extremity a finger 104 which extends over the upper edge of bar 101 so that, when the bar is elevated, shaft 98 will rock clockwise as viewed in Fig. 2 to operate the circular marking device. With this construction the marking device may be in any position on the map table and will be responsive to energization of magnet 99 in any position.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claim.

What is claimed is:

In combination, a stylus movable across a surface to record a continuous line thereon, a marking device comprising a circular marking wick and an enclosed ink reservoir connected thereto, said wick and reservoir surrounding the stylus and normally spaced from the said surface, and means for effecting a straight line reciprocation of the marking device in a direction parallel to the axis of the stylus to deposit an ink ring upon the line traced by the stylus.

FREDERICK Q. RAST.

REFERENCES CITED

The following references are of record in the file of this patent:

UNITED STATES PATENTS

| Number | Name | Date |
|---|---|---|
| 334,399 | Walter | Jan. 12, 1886 |
| 727,235 | Wallace | May 5, 1903 |
| 1,296,305 | Mehren | Mar. 4, 1919 |
| 1,655,615 | Kreisel | Jan. 10, 1928 |
| 1,855,613 | Smith | Apr. 26, 1932 |
| 1,873,126 | Hugershoff | Aug. 23, 1932 |
| 2,118,081 | Grisdale | May 24, 1938 |
| 2,171,327 | Anderson | Aug. 29, 1939 |

FOREIGN PATENTS

| Number | Country | Date |
|---|---|---|
| 594,675 | Germany | Mar. 20, 1934 |